United States Patent
Wang et al.

(10) Patent No.: US 8,477,100 B2
(45) Date of Patent: Jul. 2, 2013

(54) KEYBOARD MODULE AND ELECTRONIC APPARATUS

(75) Inventors: Chih-Kuang Wang, Taoyuan County (TW); Yien-Chun Kuo, Taoyuan County (TW); Yun-Long Tan, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1256 days.

(21) Appl. No.: 12/261,063

(22) Filed: Oct. 30, 2008

(65) Prior Publication Data

US 2009/0167690 A1  Jul. 2, 2009

(30) Foreign Application Priority Data

Dec. 27, 2007  (TW) ............................. 96150583 A
Mar. 13, 2008  (TW) ............................. 97108882 A

(51) Int. Cl.
*G06F 3/02* (2006.01)
*G09G 5/00* (2006.01)

(52) U.S. Cl.
USPC ........................................................ 345/168

(58) Field of Classification Search
USPC ............................................................ 400/49
See application file for complete search history.

(56) References Cited

U.S. PATENT DOCUMENTS

| | | | | |
|---|---|---|---|---|
| 4,532,395 A | * | 7/1985 | Zukowski | 200/314 |
| 5,053,585 A | * | 10/1991 | Yaniger | 178/18.05 |
| 5,180,237 A | * | 1/1993 | Chen | 400/479 |
| 5,235,636 A | * | 8/1993 | Takagi et al. | 379/368 |
| 6,139,362 A | * | 10/2000 | Brown | 439/567 |
| 6,218,966 B1 | | 4/2001 | Goodwin et al. | |
| 7,106,305 B2 | | 9/2006 | Rosenberg | |
| 2003/0117371 A1 | | 6/2003 | Roberts et al. | |
| 2005/0259081 A1 | * | 11/2005 | Sato | 345/169 |
| 2005/0263377 A1 | | 12/2005 | Huang | |
| 2006/0181509 A1 | * | 8/2006 | Wang | 345/156 |
| 2006/0204303 A1 | * | 9/2006 | Yurochko et al. | 400/49 |
| 2009/0179861 A1 | * | 7/2009 | Skillman et al. | 345/168 |

FOREIGN PATENT DOCUMENTS

| | | |
|---|---|---|
| CN | 1387355 | 12/2002 |
| CN | 200990323 | 12/2007 |
| DE | 20102197 | 6/2001 |
| DE | 2006011302 | * 9/2006 |
| DE | 202006011302 | 9/2006 |
| EP | 1699065 | 9/2006 |
| JP | 01-243325 | 9/1989 |
| TW | I229357 | 3/2005 |
| TW | 200644015 | 12/2006 |
| TW | M311082 | 5/2007 |

(Continued)

OTHER PUBLICATIONS

Machine translation of DE202006011302.*

(Continued)

*Primary Examiner* — Amare Mengistu
*Assistant Examiner* — Antonio Xavier
(74) *Attorney, Agent, or Firm* — Jianq Chyun IP Office

(57) ABSTRACT

A keyboard module suitable for being applied to an electronic apparatus is provided. The electronic apparatus includes a display unit and the keyboard module. The keyboard module is electrically connected to the display unit. The keyboard module includes a supporting structure, a membrane circuit sheet, and a vibrator. The supporting structure has a carrying surface. The membrane circuit sheet is disposed on the carrying surface of the supporting structure and has a plurality of triggers. The vibrator is connected to the supporting structure.

15 Claims, 18 Drawing Sheets

FOREIGN PATENT DOCUMENTS

WO    WO 2005081275 A1 *  9/2005

OTHER PUBLICATIONS

"2nd OA of European Counterpart Application" issued on Feb. 26, 2010, p. 1-4.

"Office Action of European counterpart application", issued on Aug. 19, 2009, p. 1-p. 4.

"Search Report of European counterpart application", issued on Mar. 20, 2009, p. 1-p. 6.

* cited by examiner

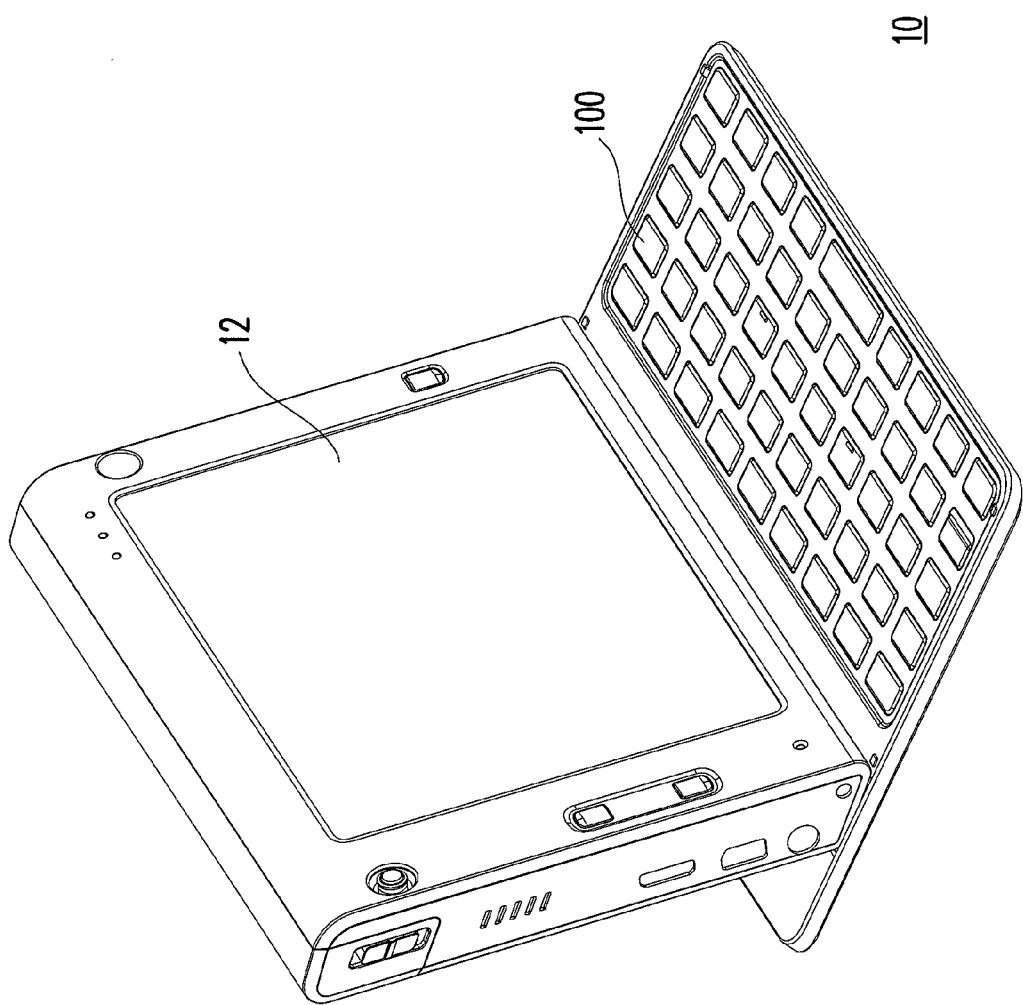

KEYBOARD MODULE AND ELECTRONIC APPARATUS

CROSS-REFERENCE TO RELATED APPLICATION

This application claims the priority benefits of Taiwan patent applications serial no. 96150583, filed on Dec. 27, 2007, and serial no. 97108882, filed on Mar. 13, 2008. The entirety of each of the above-mentioned patent applications is hereby incorporated by reference herein and made a part of specification.

BACKGROUND OF THE INVENTION

1. Field of the Invention

The present invention generally relates to an electronic apparatus, in particular, to a keyboard module applied in an electronic apparatus.

2. Description of Related Art

Along with the development of technologies, people rely more and more on electronic products. Various handheld electronic apparatuses, such as ultra mobile personal computer (UMPC), personal digital assistant (PDA), and mobile phone, have been developed to meet people's requirement for high-speed, high-performance, light, and slim electronic products.

The keys on an existing keyboard (either a keyboard of a desktop computer or a keyboard of a notebook computer) usually require a large stroke. Accordingly, such a keyboard cannot be applied to a handheld electronic apparatus due to the limitation in the thickness of the handheld electronic apparatus. To be specific, the key structure in an existing keyboard applied in a handheld electronic apparatus includes a circuit board, a rubber layer, and a key, wherein the circuit board has at least one metal dome switch, and the rubber layer has a protrusion corresponding to the metal dome switch. A user can sense the tactile feedback provided by the metal dome switch when the user presses the key. However, a keyboard adopting such a key structure is usually very thick.

SUMMARY OF THE INVENTION

Accordingly, the present application is directed to a keyboard module suitable for being applied to an electronic apparatus, wherein the keyboard module has a limited thickness.

The present application is directed to an electronic apparatus having a keyboard module, wherein the keyboard module has a limited thickness.

The present application provides a keyboard module suitable for being applied to an electronic apparatus. The keyboard module includes a supporting structure, a membrane circuit sheet, and a vibrator. The supporting structure has a carrying surface. The membrane circuit sheet is disposed on the carrying surface of the supporting structure and has a plurality of triggers. The vibrator is connected to the supporting structure.

The present application provides an electronic apparatus including a display unit and the keyboard module as described above. The keyboard module is electrically connected to the display unit.

As described above, when a user presses the membrane circuit sheet directly or indirectly, the vibrator vibrates the supporting structure and the membrane circuit sheet disposed thereon to provide a tactile feedback in correspondence with the press of the user to the membrane circuit sheet. In addition, the thickness of the keyboard module which adopts foregoing membrane circuit sheet is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a perspective view of an electronic apparatus according to an embodiment of the present invention.

DESCRIPTION OF THE EMBODIMENTS

Figure 2A:
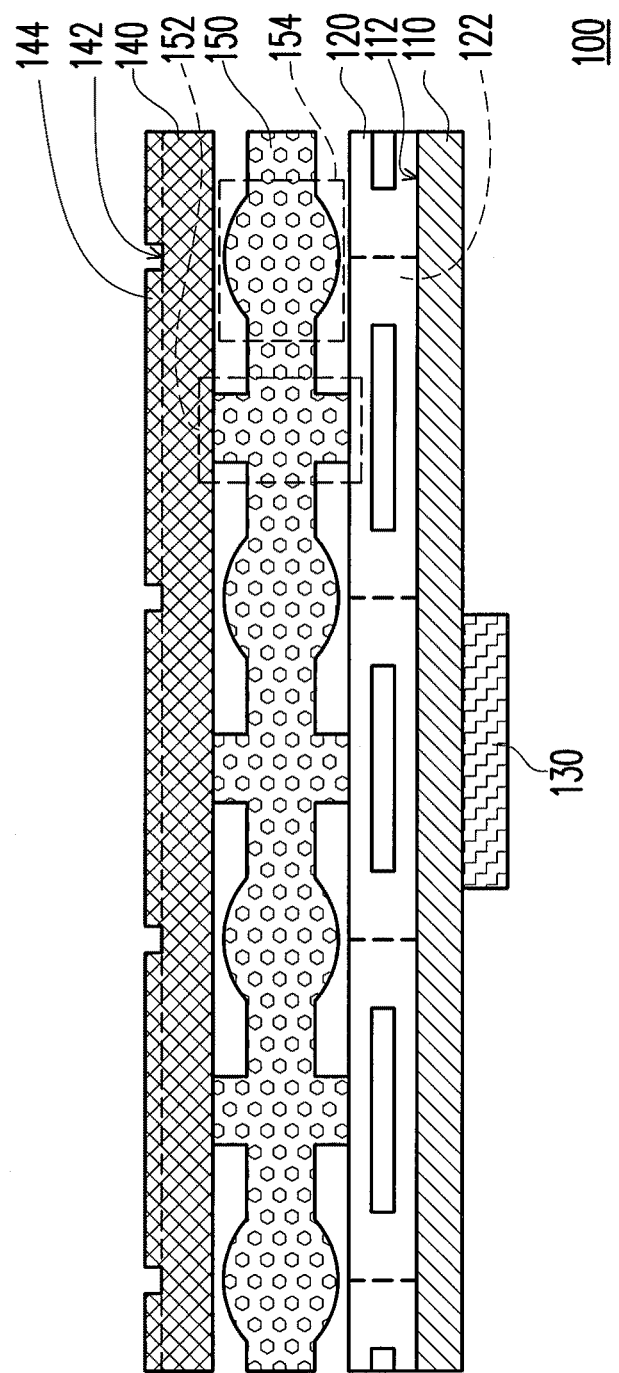
FIG. 2A is a cross-sectional view of a keyboard module in FIG. 1.

Reference will now be made in detail to the present embodiments of the invention, examples of which are illustrated in the accompanying drawings. Wherever possible, the same reference numbers are used in the drawings and the description to refer to the same or like parts.

FIG. 1 is a perspective view of an electronic apparatus according to an embodiment of the present invention. Referring to FIG. 1, in the present embodiment, the electronic apparatus 10 may be an ultra mobile personal computer (UMPC). The electronic apparatus 10 includes a display unit 12 and a keyboard module 100, wherein the keyboard module 100 is electrically connected to the display unit 12. In the present embodiment, the keyboard module 100 and the display unit 12 are independent to each other. However, in another embodiment of the present invention, the keyboard module 100 and the display unit 12 may also be disposed on the same body.

FIG. 2A is a cross-sectional view of the keyboard module in FIG. 1. Referring to FIG. 2A, in the present embodiment, the keyboard module 100 includes a supporting structure 110, a membrane circuit sheet 120, and a vibrator 130. The supporting structure 110 has a carrying surface 112. The membrane circuit sheet 120 is disposed on the carrying surface 112 of the supporting structure 110 and has a plurality of triggers 122. The vibrator 130 is connected to the supporting structure 110 and disposed below the supporting structure 110.

When these triggers 122 are pressed by a user directly or indirectly, the vibrator 130 starts to vibrate to provide a tactile feedback in correspondence with the press of the user to the triggers 122. To be specific, the triggers 122 usually include an upper electrical contact and a lower electrical contact (not shown), and when these triggers 122 are pressed by the user directly or indirectly and accordingly the two electrical contacts touch each other, signals are generated by these triggers 122 and transmitted to a central processing unit (CPU) or a microprocessor unit (MPU) in the electronic apparatus 10 (referring to FIG. 1) or a MPU in the keyboard module 100 (not shown). The CPU or MPU then drive the vibrator 130 to vibrate correspondingly so as to provide a tactile feedback in correspondence with the press of the user to the triggers 122. In the present embodiment, the vibrator 130 may vibrate vertically. However, the vibrator 130 may also vibrate horizontally or in other directions. In addition, the vibrator 130 may be a revolving vibrator or a linear vibrator.

Figure 2B:
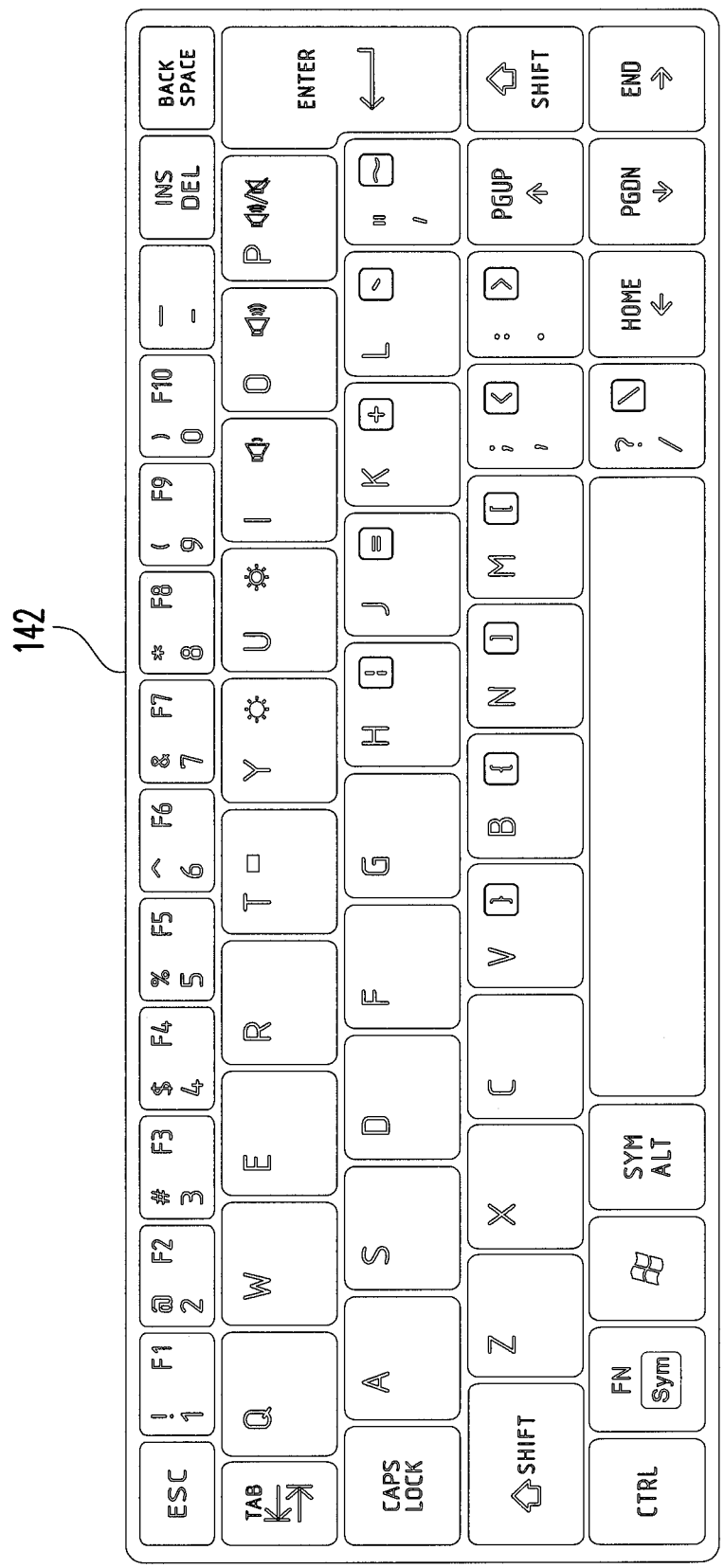
FIG. 2B illustrates a decorative surface of a decorative sheet in FIG. 2A.

FIG. 2B illustrates the decorative surface of a decorative sheet in FIG. 2A. Referring to FIG. 2A and FIG. 2B, the keyboard module 100 may further include a decorative sheet 140, wherein the decorative sheet 140 is disposed on the membrane circuit sheet 120 and has a decorative surface 142. In the present embodiment, the decorative sheet 140 has a plurality of marks (for example, icons, symbols, characters, or numbers). Besides, the decorative sheet 140 may further have a plurality of protrusions 144, wherein the protrusions 144 are protruded from the decorative surface 142 and are respectively corresponding to the triggers 122. The marks are respectively located on the protrusions 144 so that when a user touches these protrusions 144 with a finger, the position of the finger can be obtained.

Referring to FIG. 2A, the keyboard module 100 may further include a first elastic layer 150 disposed between the decorative sheet 140 and the membrane circuit sheet 120. The first elastic layer 150 has a plurality of protrusions 152 and a plurality of spacers 154, wherein the protrusions 152 are respectively corresponding to the triggers 122, and one of the spacers 154 is disposed between adjacent two of the protrusions 152. In the present embodiment, the first elastic layer 150 may be made of rubber. Besides, the thicknesses of the protrusions 152 and the spacers 154 are greater than the thicknesses of other portions of the first elastic layer 150.

Figure 2C:
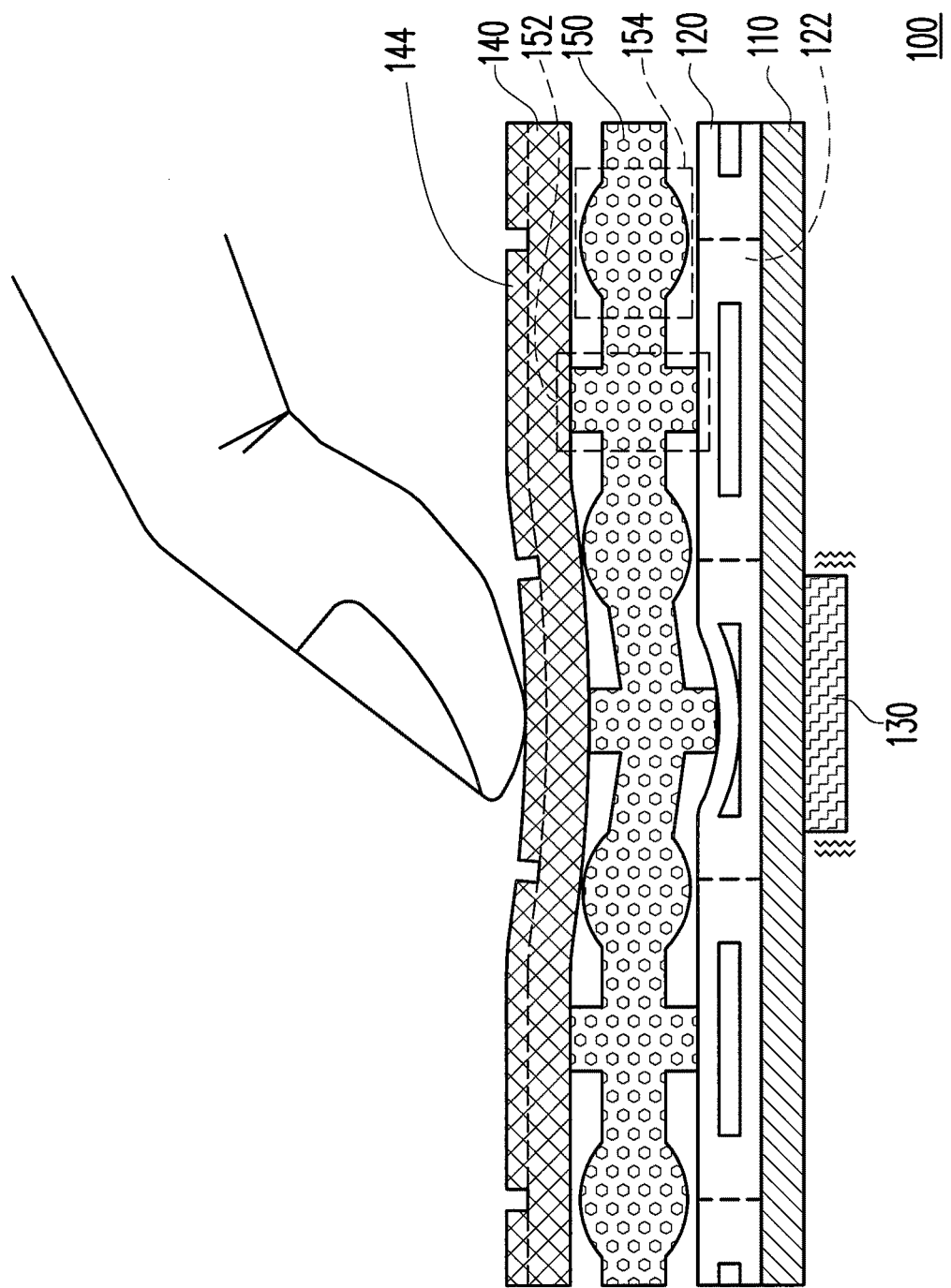
FIG. 2C illustrates that the keyboard module in FIG. 2A is pressed by a finger.

FIG. 2C illustrates that the keyboard module in FIG. 2A is pressed by a finger. Referring to FIG. 2C, when a user presses a protrusion 144 on the decorative sheet 140 with a finger, the protrusion 152 is moved downward to press the membrane circuit sheet 120 so that the trigger 122 corresponding to the protrusion 144 is also pressed. Accordingly, the vibrator 130 connected to the supporting structure 110 starts to vibrate to provide a tactile feedback in correspondence with the press of the user to the trigger 122.

It should be noted that when the protrusion 152 is pressed by an external force and accordingly presses the membrane circuit sheet 120, the spacer 154 adjacent to the protrusion 152 reduces the deformations of other areas of the first elastic layer 150, so that inappropriate press to the trigger 122 corresponding to another protrusion 152 and accordingly the generation of unneeded signal can be avoided.

Figure 3:
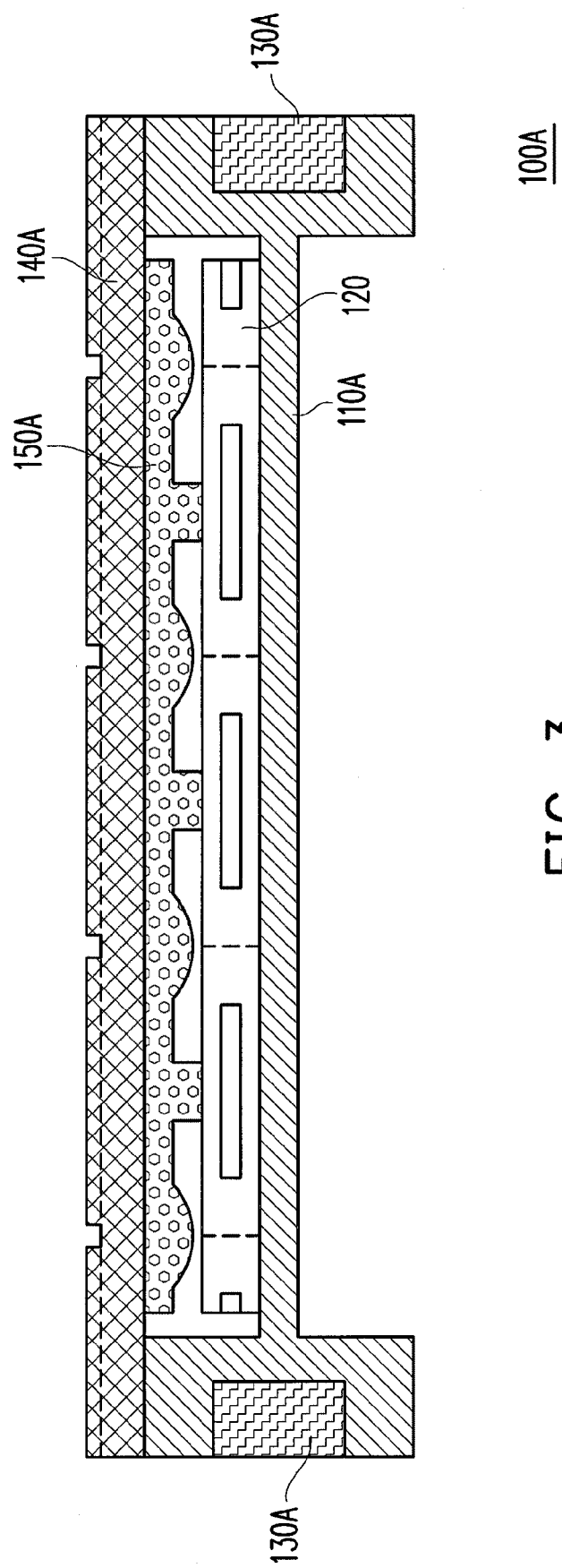
FIG. 3 is a cross-sectional view of a keyboard module according to an embodiment of the present invention.

FIG. 3 is a cross-sectional view of a keyboard module according to an embodiment of the present invention. Referring to both FIG. 2A and FIG. 3, the keyboard module 100A in FIG. 3 is similar to the keyboard module 100 in FIG. 2A, and the differences between the two are that the decorative sheet 140A and the first elastic layer 150A of the keyboard module 100A in FIG. 3 are formed integrally, and a plurality of vibrators 130A are connected to the supporting structure 110A and are located at one side of the membrane circuit sheet 120.

Figure 4:
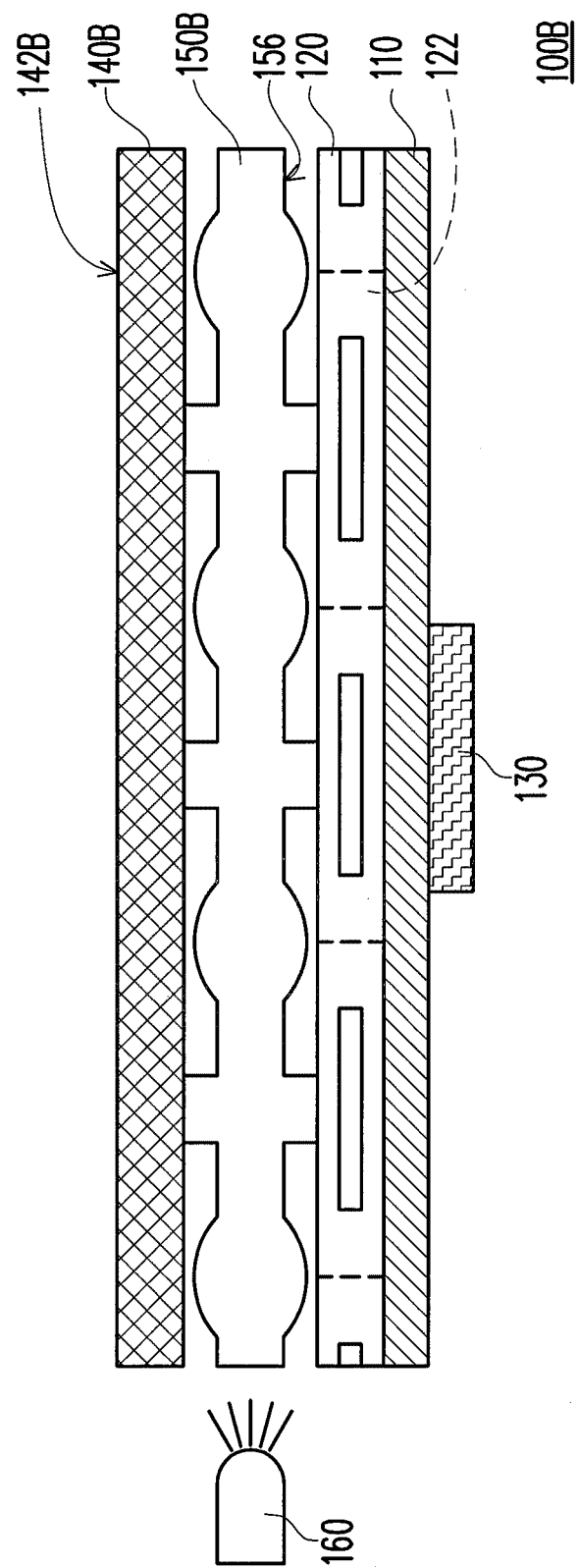
FIG. 4 is a cross-sectional view of a keyboard module according to an embodiment of the present invention.

FIG. 4 is a cross-sectional view of a keyboard module according to an embodiment of the present invention. Referring to FIG. 2A and FIG. 4, the keyboard module 100B in FIG. 4 is similar to the keyboard module 100 in FIG. 2A, and the difference between the two is that the keyboard module 100B in FIG. 4 further includes a light source 160. The light source 160 is disposed at one side of the first elastic layer 150B and emits a light beam into the first elastic layer 150B, wherein the first elastic layer 150B is transparent and has a reflective surface 156 close to the first elastic layer 150B for reflecting the light beam to the decorative sheet 140B, so as to display the marks on the decorative surface 142B. In the present embodiment, the first elastic layer 150B may be made of transparent silicone, and the decorative surface 142B of the decorative sheet 140B is a plane.

Figure 5:
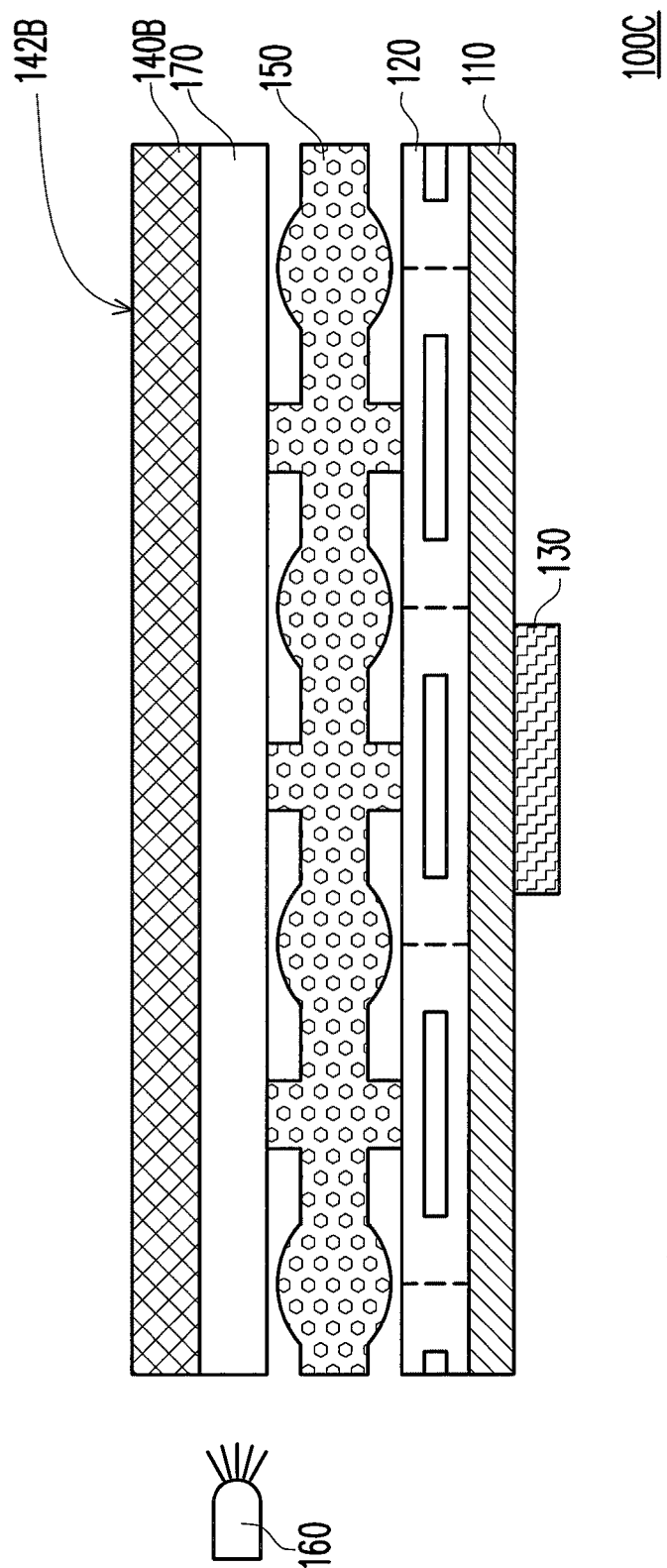
FIG. 5 is a cross-sectional view of a keyboard module according to an embodiment of the present invention.

FIG. 5 is a cross-sectional view of a keyboard module according to an embodiment of the present invention. Referring to both FIG. 2A and FIG. 5, the keyboard module 100C in FIG. 5 is similar to the keyboard module 100 in FIG. 2A, and the difference between the two is that the keyboard module 100C in FIG. 5 further includes a light source 160 and a light guiding layer 170. The light guiding layer 170 is disposed between the decorative sheet 140B and the first elastic layer 150. The light source 160 is disposed at one side of the light guiding layer 170 for emitting a light beam to the light guiding layer 170, wherein the light guiding layer 170 guides the light beam to the decorative sheet 140B to display the marks (referring to FIG. 2B) on the decorative surface 142B above the decorative sheet 140B. Besides, the decorative surface 142B of the decorative sheet 140B is a plane.

Figure 6A:
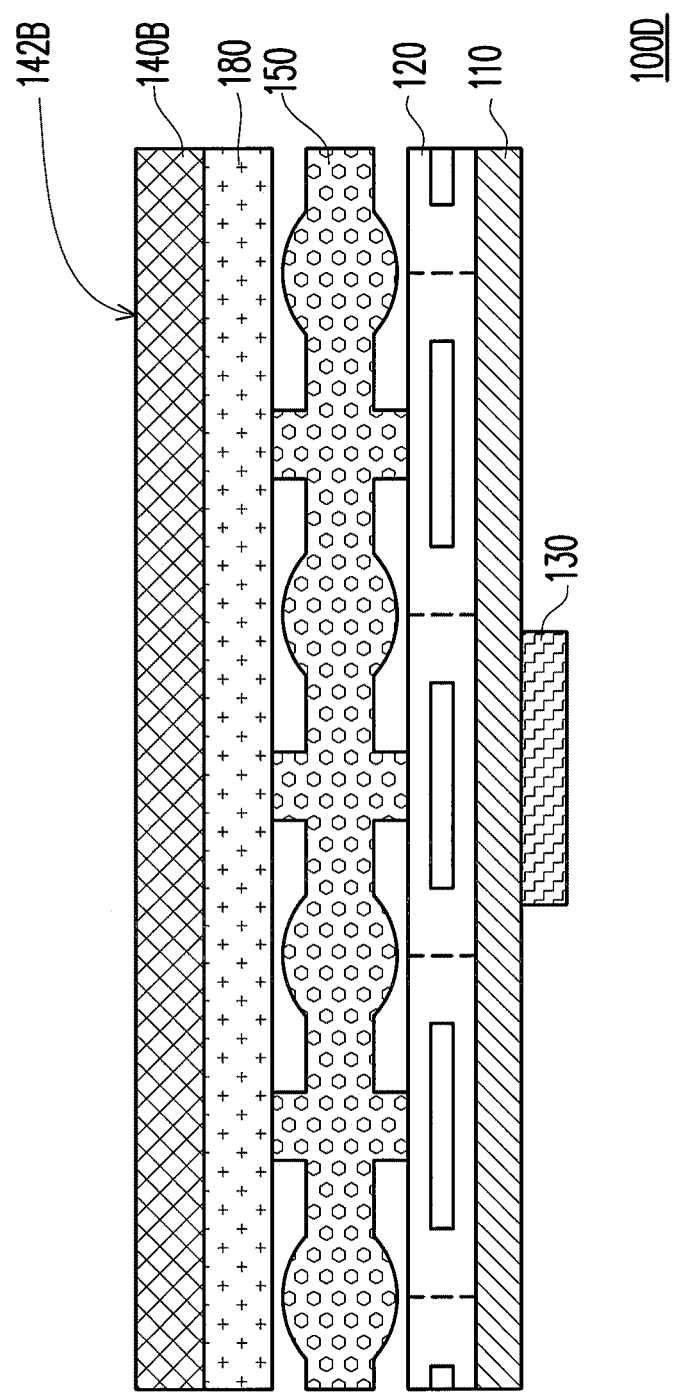
FIG. 6A is a cross-sectional view of a keyboard module according to an embodiment of the present invention.

FIG. 6A is a cross-sectional view of a keyboard module according to an embodiment of the present invention. Referring to both FIG. 2A and FIG. 6A, the keyboard module 100D in FIG. 6A is similar to the keyboard module 100 in FIG. 2A, and the difference between the two is that the keyboard module 100D in FIG. 6A further includes a light emitting layer 180 disposed between the decorative sheet 140B and the first elastic layer 150. Besides, the decorative surface 142B of the decorative sheet 140B is a plane. The light emitting layer 180 emits a light beam to the decorative sheet 140B so as to display the marks (referring to FIG. 2B) on the decorative surface 142B above the decorative sheet 140B. In the present embodiment, the light emitting layer 180 may be an electroluminescence (EL) film or an organic electro-luminescence (OEL) film.

Figure 6B:
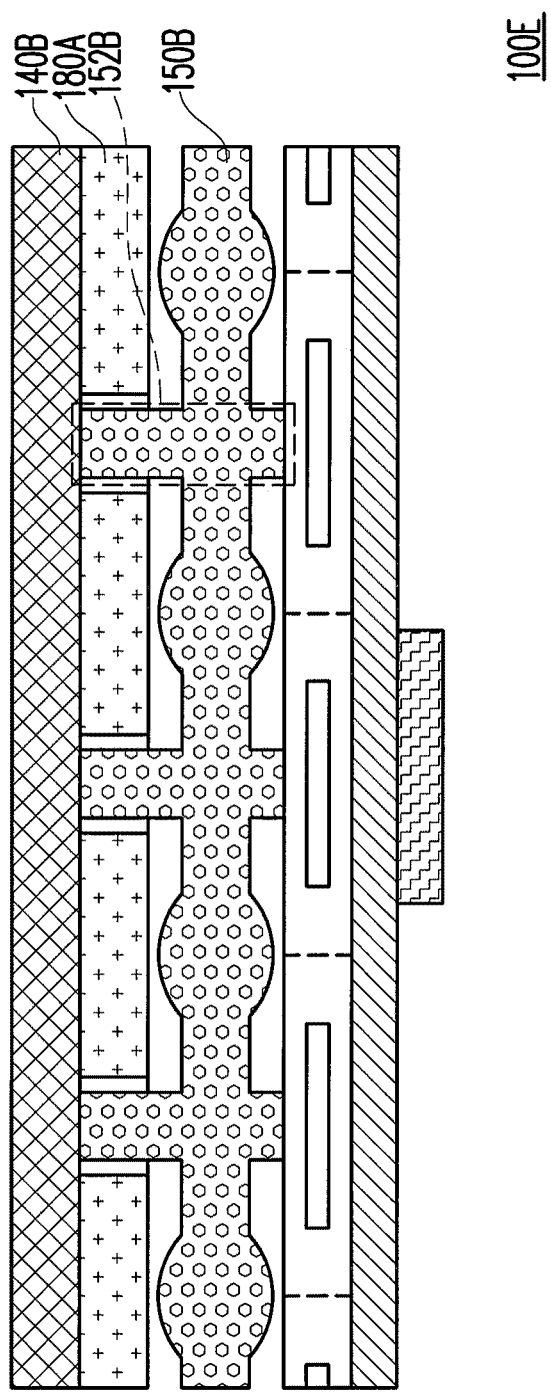
FIG. 6B is a cross-sectional view of a keyboard module according to an embodiment of the present invention.

FIG. 6B is a cross-sectional view of a keyboard module according to an embodiment of the present invention. Referring to both FIG. 6A and FIG. 6B, the keyboard module 100E in FIG. 6B is similar to the keyboard module 100D in FIG. 6A, and the difference between the two is that the protrusions 152B of the first elastic layer 150B of the keyboard module 100E in FIG. 6B further pass through the light emitting layer 180A and are extended to the decorative sheet 140B.

Figure 7:
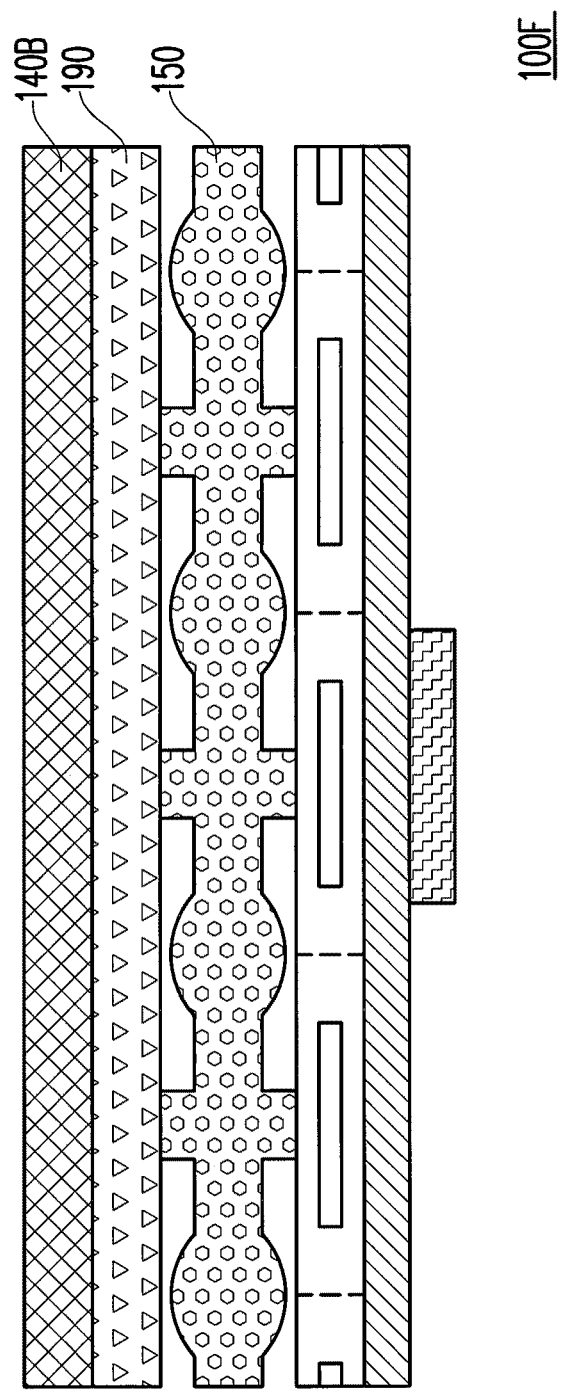
FIG. 7 is a cross-sectional view of a keyboard module according to an embodiment of the present invention.

FIG. 7 is a cross-sectional view of a keyboard module according to an embodiment of the present invention. Referring to FIG. 2A and FIG. 7, the keyboard module 100F in FIG. 7 is similar to the keyboard module 100 in FIG. 2A, and the difference between the two is that the keyboard module 100F in FIG. 7 further includes a touch sensing panel 190 disposed between the decorative sheet 140B and the first elastic layer 150. In the present embodiment, the touch sensing panel 190 may be a capacitive touch panel or a resistive touch panel such that a user can input signals with a finger.

Figure 8A:
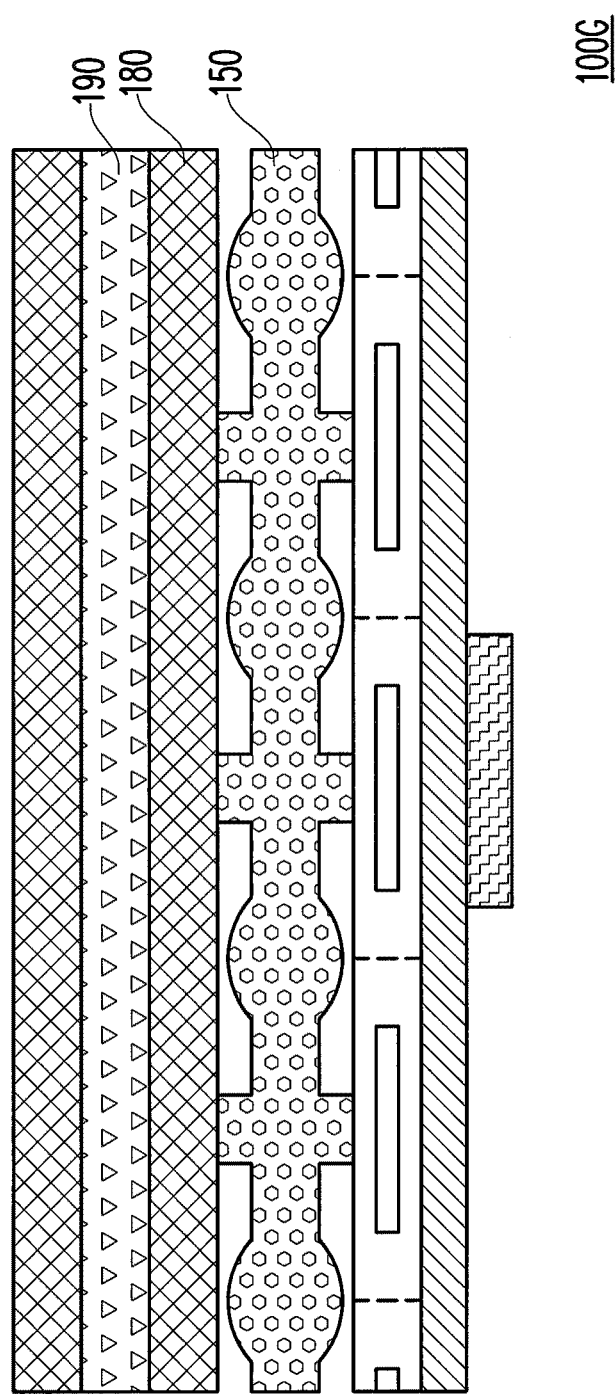
FIG. 8A is a cross-sectional view of a keyboard module according to an embodiment of the present invention.

FIG. 8A is a cross-sectional view of a keyboard module according to an embodiment of the present invention. Referring to FIG. 7 and FIG. 8A, the keyboard module 100G in FIG. 8A is similar to the keyboard module 100F in FIG. 7, and the difference between the two is that the keyboard module 100G in FIG. 8A further includes a light emitting layer 180 disposed between the touch sensing panel 190 and the first elastic layer 150.

Figure 8B:
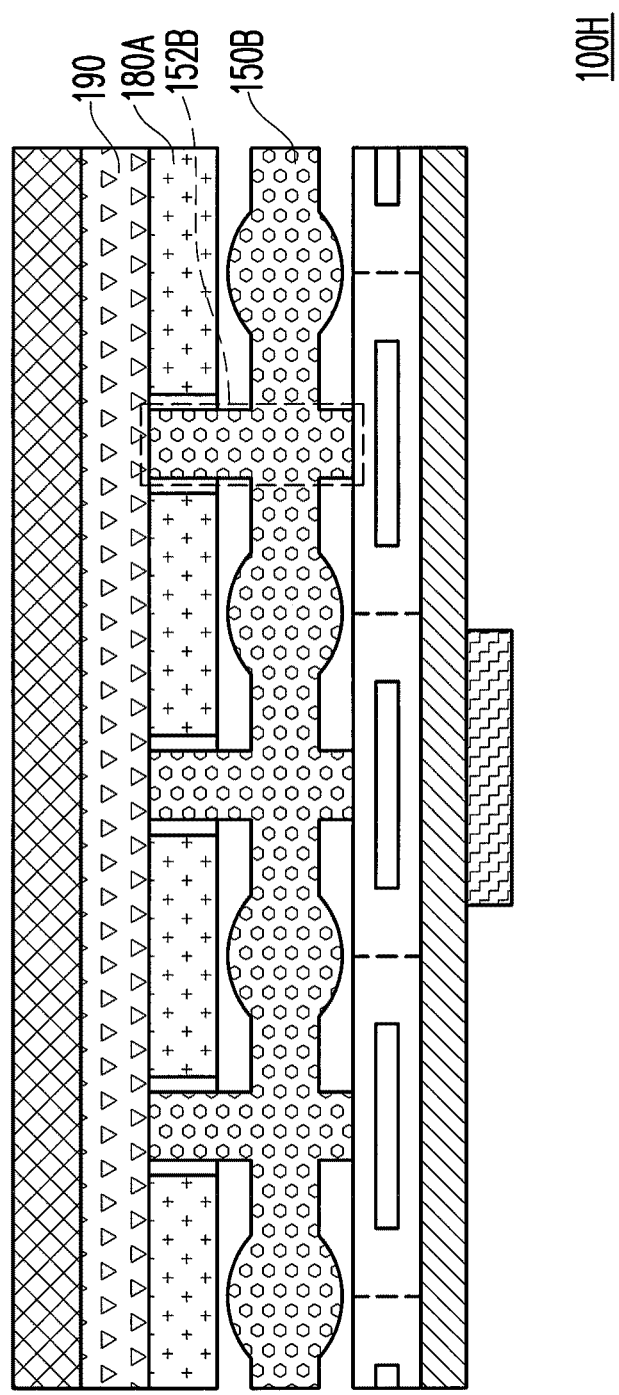
FIG. 8B is a cross-sectional view of a keyboard module according to an embodiment of the present invention.

FIG. 8B is a cross-sectional view of a keyboard module according to an embodiment of the present invention. Referring to FIG. 8A and FIG. 8B, the keyboard module 100H in FIG. 8B is similar to the keyboard module 100G in FIG. 8A, and the difference between the two is that the protrusions 152B of the first elastic layer 150B of the keyboard module 100H in FIG. 8B further pass through the light emitting layer 180A and are extended to the touch sensing panel 190.

Figure 8C:
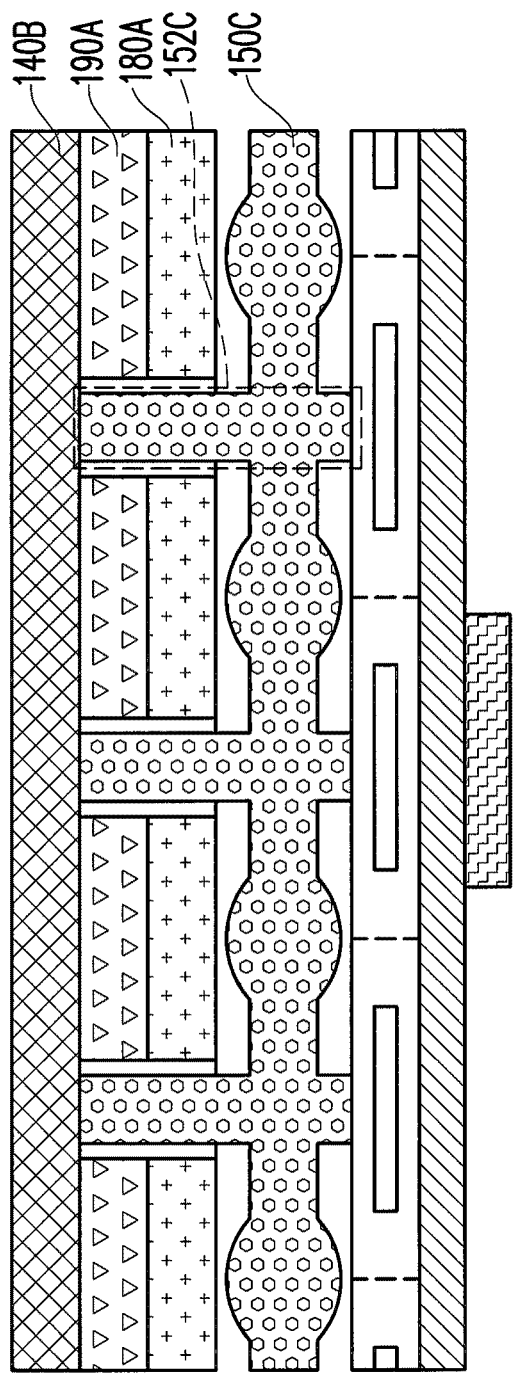
FIG. 8C is a cross-sectional view of a keyboard module according to an embodiment of the present invention.

FIG. 8C is a cross-sectional view of a keyboard module according to an embodiment of the present invention. Referring to FIG. 8B and FIG. 8C, the keyboard module 100I in FIG. 8C is similar to the keyboard module 100H in FIG. 8B, and the difference between the two is that the protrusions 152C of the keyboard module 100I in FIG. 8C further pass through the light emitting layer 180A and the touch sensing panel 190A and are extended to the decorative sheet 140B.

Figure 9A:
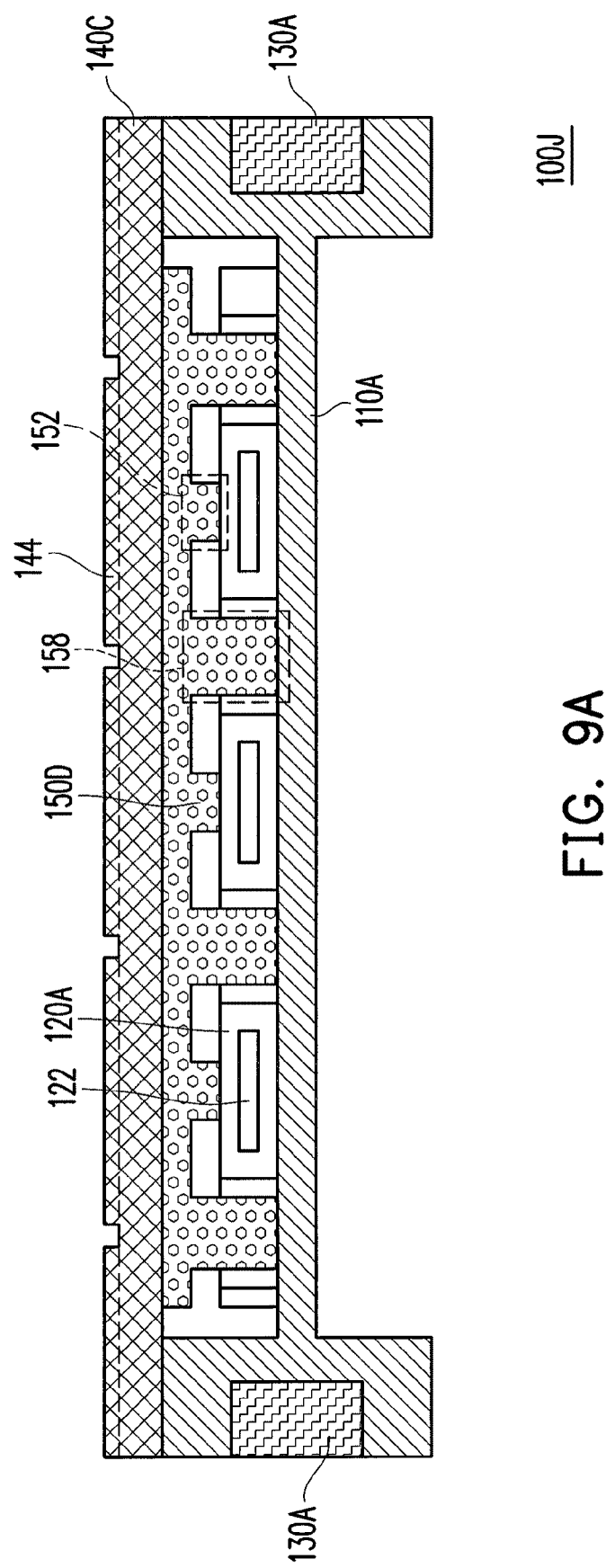
FIG. 9A is a cross-sectional view of a keyboard module according to an embodiment of the present invention.
Figure 9B:
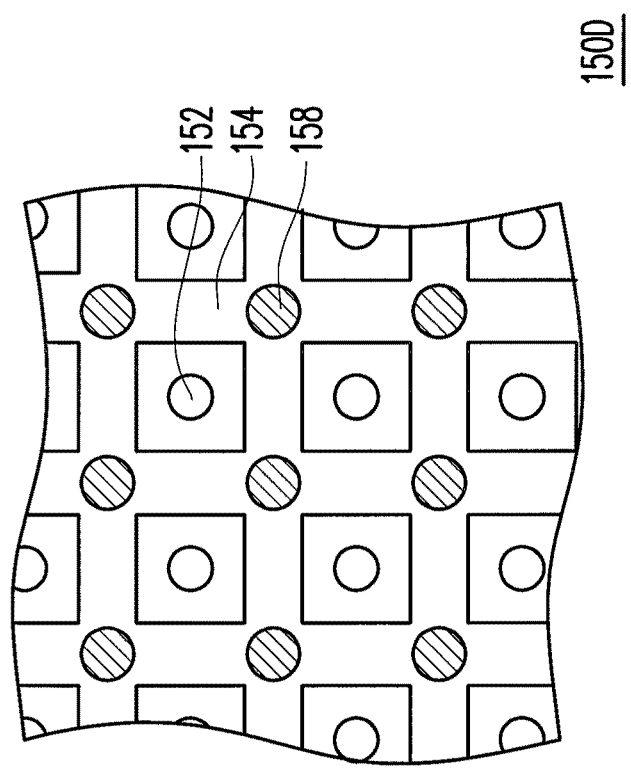
FIG. 9B is a partial enlarged top view of the first elastic layer in FIG. 9A.

FIG. 9A is a cross-sectional view of a keyboard module according to an embodiment of the present invention, and FIG. 9B is a partial enlarged top view of the elastic layer in FIG. 9A. Referring to FIG. 3, FIG. 9A, and FIG. 9B, the keyboard module 100J in FIG. 9A is similar to the keyboard module 100A in FIG. 3, and the difference between the two is that the first elastic layer 150D of the keyboard module 100J in FIG. 9A further has a plurality of vibration conductors 158, and these vibration conductors 158 pass through the membrane circuit sheet 120A and are extended to the supporting structure 110A. Because both the first elastic layer 150D and the membrane circuit sheet 120A can absorb part of the vibration power of the vibrator 130A, in the keyboard module 100J of the present embodiment, the vibration conductors 158 are in contact with the supporting structure 110A so that the power consumption can be reduced and a user can sense the vibration obviously.

To be specific, in the present embodiment, each of the vibration conductors 158 is disposed between any adjacent four protrusions 152 for conducting the vibration. In other words, when a user press a protrusion 144 on the decorative sheet 140C with a finger, the protrusion 152 moves downward to press the membrane circuit sheet 120A so that a trigger 122 corresponding to the protrusion 144 is pressed. Then, the vibrator 130A connected to the supporting structure 110A receives a corresponding electronic signal and starts to vibrate, and the vibration conductors 158 around the protrusions 152 conduct the vibration of the vibrator 130A to the decorative sheet 140C to provide a tactile feedback in correspondence with the press of the user to the trigger 122. Thus, most of the vibration power issued by the vibrator 130A is conducted to the decorative sheet 140C through the vibration conductors 158 and accordingly the vibration amplitude is increased.

Figure 10:
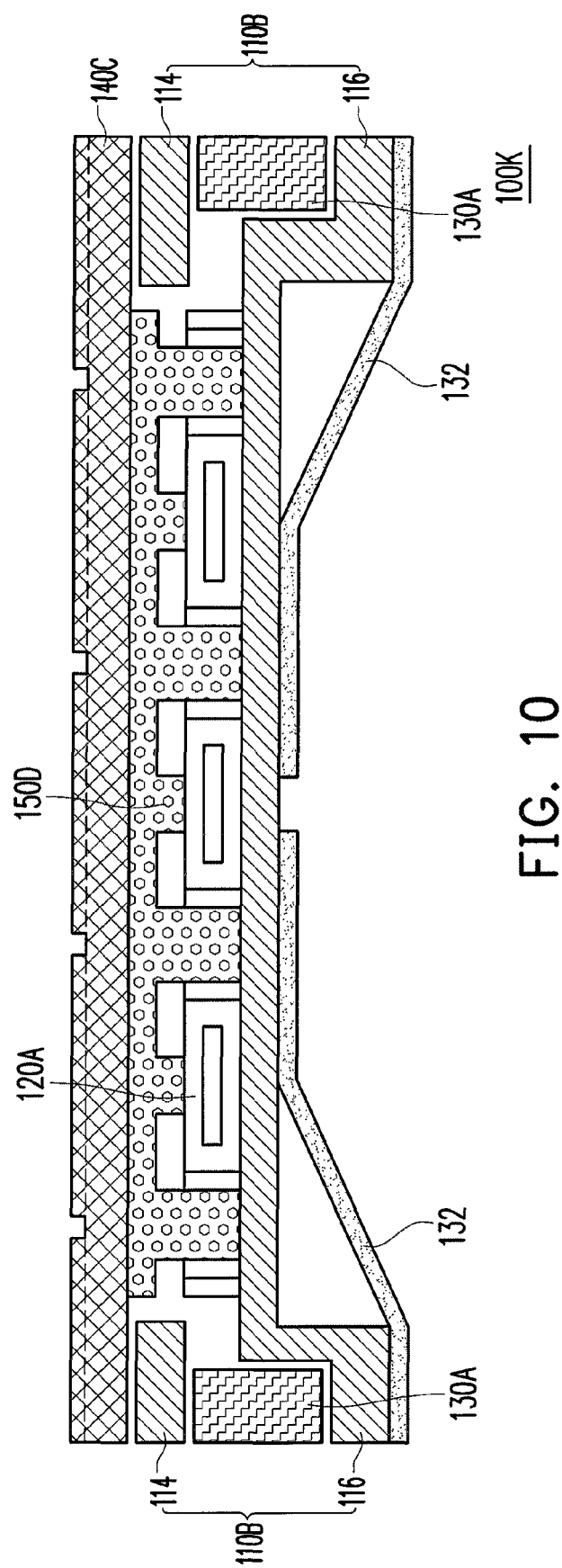
FIG. 10 is a cross-sectional view of a keyboard module according to an embodiment of the present invention.

FIG. 10 is a cross-sectional view of a keyboard module according to an embodiment of the present invention. Referring to FIG. 10 and FIG. 9A, the keyboard module 100K in FIG. 10 is similar to the keyboard module 100J in FIG. 9A, and the differences between the two are that the keyboard module 100K in FIG. 10 further includes a plurality of auxiliary vibration conductors 132, and the supporting structure 110B has an upper supporting structure 114 and a lower supporting structure 116. The auxiliary vibration conductors 132 span between a portion of the lower supporting structure 116 in contact with the vibrator 130A and another portion of the lower supporting structure 116 not in contact with the vibrator 130A.

To be specific, the upper supporting structure 114 is disposed between the decorative sheet 140C and a plurality of vibrators 130A, and the lower supporting structure 116 is disposed between a plurality of vibrators 130A and a plurality of auxiliary vibration conductors 132, wherein the auxiliary vibration conductors 132 are used for conducting the vibration of the vibrators 130A to the center of the lower supporting structure 116 or a part of the lower supporting structure 116 which receives less vibration, so that the decorative sheet 140C can provide approximately the same tactile feedback to the user at any position thereon. Besides, the auxiliary vibration conductors 132 and the lower supporting structure 116 may also be integrated into a single component.

Figure 11A:
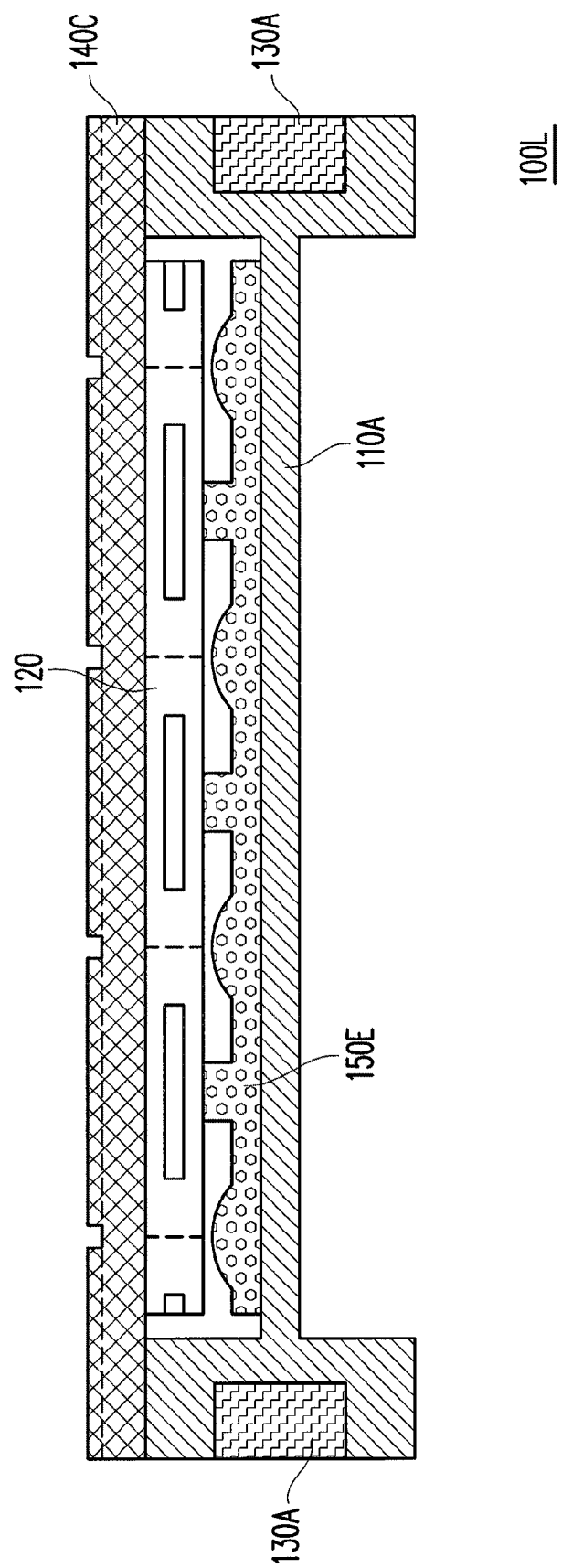
FIG. 11A is a cross-sectional view of a keyboard module according to an embodiment of the present invention.

FIG. 11A is a cross-sectional view of a keyboard module according to an embodiment of the present invention. Referring to FIG. 3 and FIG. 11A, the keyboard module 100L in FIG. 11A is similar to the keyboard module 100A in FIG. 3, and the difference between the two is that the second elastic layer 150E of the keyboard module 100L in FIG. 11A is disposed between the membrane circuit sheet 120 and the supporting structure 110A. In short, the relative position between the second elastic layer 150E and the membrane circuit sheet 120 in FIG. 11A is contrary to the relative position between the first elastic layer 150A and the membrane circuit sheet 120 in FIG. 3.

Figure 11B:
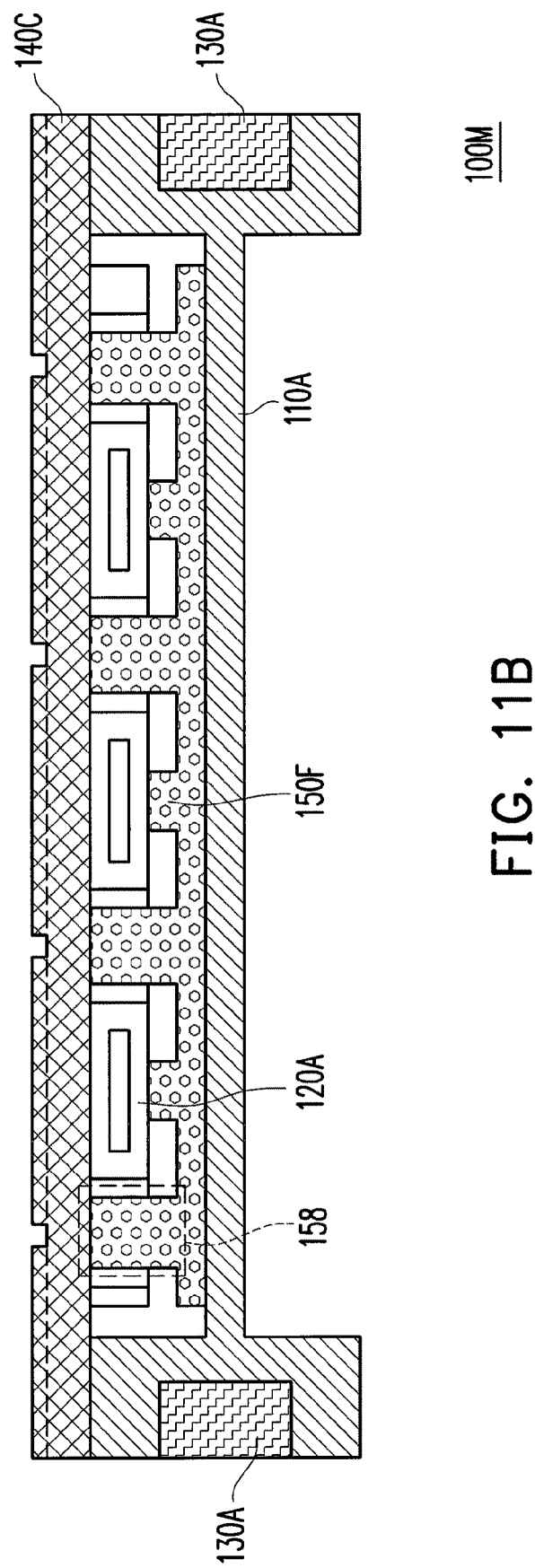
FIG. 11B is a cross-sectional view of a keyboard module according to an embodiment of the present invention.

FIG. 11B is a cross-sectional view of a keyboard module according to an embodiment of the present invention. Referring to FIG. 11A and FIG. 11B, the keyboard module 100M in FIG. 11B is similar to the keyboard module 100L in FIG. 11A, and the difference between the two is that the second elastic layer 150F of the keyboard module 100M in FIG. 11B further has a plurality of vibration conductors 158, wherein the vibration conductors 158 are extended to the decorative sheet 140C.

In overview, the keyboard module has a vibrator such that when a user presses the membrane circuit sheet directly or indirectly, the vibrator vibrates the supporting structure and the membrane circuit sheet thereon so as to provide a tactile feedback in correspondence with the press of the user to the membrane circuit sheet. Thereby, the tactile feedback in a conventional keyboard is simulated by using the vibrator, so as to indicate that the membrane circuit sheet has been pressed. Moreover, the thickness of such a keyboard module which adopts the membrane circuit sheet can be reduced.

It will be apparent to those skilled in the art that various modifications and variations can be made to the structure of the present invention without departing from the scope of spirit of the invention. In view of the foregoing, it is intended that the present invention cover modifications and variations of this invention provided they fall within the scope of the following claims and their equivalents.

What is claimed is:

1. A keyboard module, suitable for being applied to an electronic apparatus, the keyboard module comprising:
   a supporting structure, having a carrying surface;
   a membrane circuit sheet, disposed on the carrying surface of the supporting structure, the membrane circuit sheet having a plurality of triggers; and
   a vibrator, connected to the supporting structure;
   a decorative sheet, disposed on the membrane circuit sheet, the decorative sheet having a decorative surface; and
   a first elastic layer, disposed between the decorative sheet and the membrane circuit sheet, wherein the first elastic layer has a plurality of protrusions and a plurality of spacers, the protrusions are respectively corresponding to the triggers, one of the spacers is disposed between adjacent two of the protrusions, the first elastic layer has a plurality of vibration conductors, the vibration conductors pass through the membrane circuit sheet and are extended to the supporting structure, and one of the vibration conductors is disposed between adjacent four protrusions.

2. The keyboard module according to claim 1, wherein the decorative sheet is a plane and has a plurality of marks on the decorative surface, and the marks are respectively corresponding to the triggers.

3. The keyboard module according to claim 1, wherein the decorative sheet has a plurality of protrusions and a plurality of marks, the protrusions are protruded from the decorative surface and are respectively corresponding to the triggers, and the marks are respectively located on the protrusions.

4. The keyboard module according to claim 1, wherein the decorative sheet and the first elastic layer are formed integrally.

5. The keyboard module according to claim 1, wherein the protrusions are extended to the decorative sheet.

6. The keyboard module according to claim 1, further comprising:
   a light source, disposed at one side of the first elastic layer, the light source emitting a light beam into the first elastic layer, wherein the first elastic layer is transparent and has a reflective surface for reflecting the light beam to the decorative sheet.

7. The keyboard module according to claim 1, further comprising:
   a light guiding layer, disposed between the decorative sheet and the first elastic layer; and
   a light source, disposed at one side of the light guiding layer for emitting a light beam to the light guiding layer, wherein the light guiding layer guides the light beam to the decorative sheet.

8. The keyboard module according to claim 1, further comprising:
   a light emitting layer, disposed between the decorative sheet and the first elastic layer.

9. The keyboard module according to claim 1, further comprising:
   a touch sensing panel, disposed between the decorative sheet and the first elastic layer.

10. The keyboard module according to claim 9, wherein the protrusions are extended to the touch sensing panel.

11. The keyboard module according to claim 1, further comprising:
    an auxiliary vibration conductor, spanning between a portion of the supporting structure in contact with the vibrator and another portion of the supporting structure not in contact with the vibrator.

12. The keyboard module according to claim 11, wherein the supporting structure has an upper supporting structure and a lower supporting structure, the upper supporting structure is disposed between the decorative sheet and the vibrator, and the lower supporting structure is disposed between the vibrator and the auxiliary vibration conductor.

13. The keyboard module according to claim 1, further comprising:
    a second elastic layer, disposed between the membrane circuit sheet and the supporting structure, wherein the second elastic layer has a plurality of protrusions and a plurality of spacers, the protrusions are respectively corresponding to the triggers, and one of the spacers is disposed between adjacent two of the protrusions.

14. The keyboard module according to claim 13, wherein the second elastic layer has a plurality of vibration conductors extended to the decorative sheet.

15. An electronic apparatus, comprising:
    a display unit; and
    a keyboard module of claim 1, electrically connected to the display unit.

\* \* \* \* \*